United States Patent
Yamasaki

(10) Patent No.: US 11,290,605 B2
(45) Date of Patent: Mar. 29, 2022

(54) INFORMATION PROCESSING APPARATUS FOR TRANSFERRING DOCUMENT BETWEEN BUSINESS ASSISTANCE APPLICATIONS, METHOD, AND NON-TRANSITORY COMPUTER READABLE MEDIUM

(71) Applicant: FUJIFILM Business Innovation Corp., Tokyo (JP)

(72) Inventor: Maiko Yamasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/037,742

(22) Filed: Sep. 30, 2020

(65) Prior Publication Data
US 2021/0289085 A1    Sep. 16, 2021

(30) Foreign Application Priority Data

Mar. 12, 2020 (JP) .............................. JP2020-043352

(51) Int. Cl.
*H04N 1/00* (2006.01)

(52) U.S. Cl.
CPC ..... *H04N 1/00482* (2013.01); *H04N 1/00209* (2013.01)

(58) Field of Classification Search
None
See application file for complete search history.

(56) References Cited

U.S. PATENT DOCUMENTS

| | | | | |
|---|---|---|---|---|
| 2002/0143711 | A1* | 10/2002 | Nassiri | G06Q 20/3821 705/76 |
| 2003/0078994 | A1* | 4/2003 | Ishizuka | H04N 1/00472 709/219 |
| 2014/0019761 | A1* | 1/2014 | Shapiro | H04L 9/3247 713/176 |
| 2015/0312227 | A1* | 10/2015 | Follis | H04L 63/126 713/176 |
| 2017/0017650 | A1* | 1/2017 | Ciabarra, Jr. | G06F 40/143 |
| 2017/0032112 | A1* | 2/2017 | Follis | G06F 21/602 |
| 2018/0239959 | A1* | 8/2018 | Bui | G06F 40/103 |
| 2019/0319948 | A1* | 10/2019 | Triola | H04L 9/3218 |
| 2020/0013128 | A1* | 1/2020 | Benkreira | G06K 9/00288 |
| 2020/0065423 | A1* | 2/2020 | Lin | G06F 16/955 |
| 2020/0169415 | A1* | 5/2020 | Schmidt | H04L 9/3247 |
| 2020/0210383 | A1* | 7/2020 | Demaris | G06F 16/93 |
| 2020/0304504 | A1* | 9/2020 | Peterson | G06F 21/6218 |

FOREIGN PATENT DOCUMENTS

| | | |
|---|---|---|
| JP | 2008065580 | 3/2008 |
| JP | 4997886 | 8/2012 |

* cited by examiner

*Primary Examiner* — Henok Shiferaw
(74) *Attorney, Agent, or Firm* — JCIPRNET

(57) ABSTRACT

An information processing apparatus includes a processor configured to display information on a screen that accepts a setting of a transfer destination for an electronic document prepared in a first application that a first user is authorized to use. The information accepts selection of a second user as a candidate for the transfer destination.

12 Claims, 14 Drawing Sheets

FIG. 11

APPLICATION #11

| | ATTRIBUTE NAME | ATTRIBUTE VALUE | TRANSFER |
|---|---|---|---|
| NON-CUSTOMIZABLE ATTRIBUTE | IDENTICAL ATTRIBUTES OF DOCUMENTS 1 | aaa | ✓ |
| | ATTRIBUTE BASED ON DOCUMENT TYPE 2 | aaa | |
| | ATTRIBUTE BASED ON DOCUMENT TYPE 3 | aaa | ✓ |
| CUSTOMIZABLE ATTRIBUTE | CUSTOM ATTRIBUTE ADDED BY USER 4 | aaa | ✓ |
| | CUSTOM ATTRIBUTE ADDED BY USER 5 | aaa | |
| | CUSTOM ATTRIBUTE ADDED BY USER 6 | aaa | ✓ |

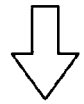

APPLICATION #12 OR #13

| | ATTRIBUTE NAME | ATTRIBUTE VALUE |
|---|---|---|
| NON-CUSTOMIZABLE ATTRIBUTE | IDENTICAL ATTRIBUTES OF DOCUMENTS 1 | aaa |
| | ATTRIBUTE BASED ON DOCUMENT TYPE 2 | |
| | ATTRIBUTE BASED ON DOCUMENT TYPE 3 | aaa |
| CUSTOMIZABLE ATTRIBUTE | CUSTOM ATTRIBUTE ADDED BY USER 4 | aaa |
| | CUSTOM ATTRIBUTE ADDED BY USER 6 | aaa |

FIG. 12

APPLICATION #11

| | ATTRIBUTE NAME | ATTRIBUTE VALUE | TRANSFER |
|---|---|---|---|
| NON-CUSTOMIZABLE ATTRIBUTE | IDENTICAL ATTRIBUTES OF DOCUMENTS 1 | aaa | ✓ |
| | ATTRIBUTE BASED ON DOCUMENT TYPE 2 | aaa | |
| | ATTRIBUTE BASED ON DOCUMENT TYPE 3 | aaa | ✓ |
| CUSTOMIZABLE ATTRIBUTE | CUSTOM ATTRIBUTE ADDED BY USER 4 | aaa | ✓ |
| | CUSTOM ATTRIBUTE ADDED BY USER 5 | aaa | |
| | CUSTOM ATTRIBUTE ADDED BY USER 6 | aaa | ✓ |

APPLICATION #12 OR #13

| | ATTRIBUTE NAME | ATTRIBUTE VALUE |
|---|---|---|
| NON-CUSTOMIZABLE ATTRIBUTE | IDENTICAL ATTRIBUTES OF DOCUMENTS 11 | |
| | ATTRIBUTE BASED ON DOCUMENT TYPE 12 | |
| | ATTRIBUTE BASED ON DOCUMENT TYPE 13 | |
| CUSTOMIZABLE ATTRIBUTE | CUSTOM ATTRIBUTE ADDED BY USER 4 | aaa |
| | CUSTOM ATTRIBUTE ADDED BY USER 6 | aaa |
| CUSTOMIZABLE ATTRIBUTE SET IN APPLICATION #12 OR #13 | CUSTOM ATTRIBUTE ADDED BY USER 7 | aaa |
| | CUSTOM ATTRIBUTE ADDED BY USER 8 | aaa |

⌐ ¬ : TREAT AS CUSTOMIZABLE ATTRIBUTE SET IN APPLICATION #12 OR #13 (SUBJECTED TO MERGING)

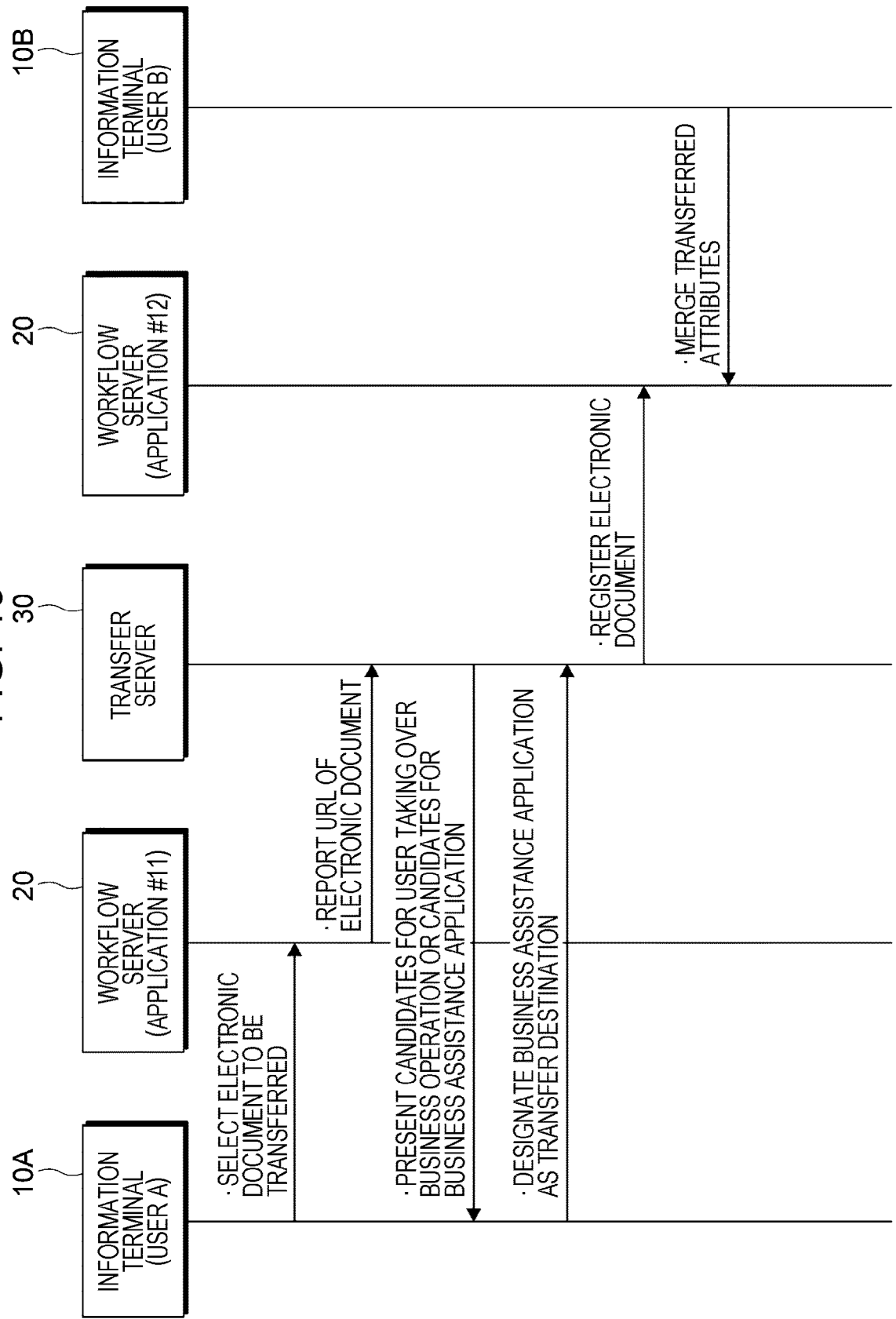

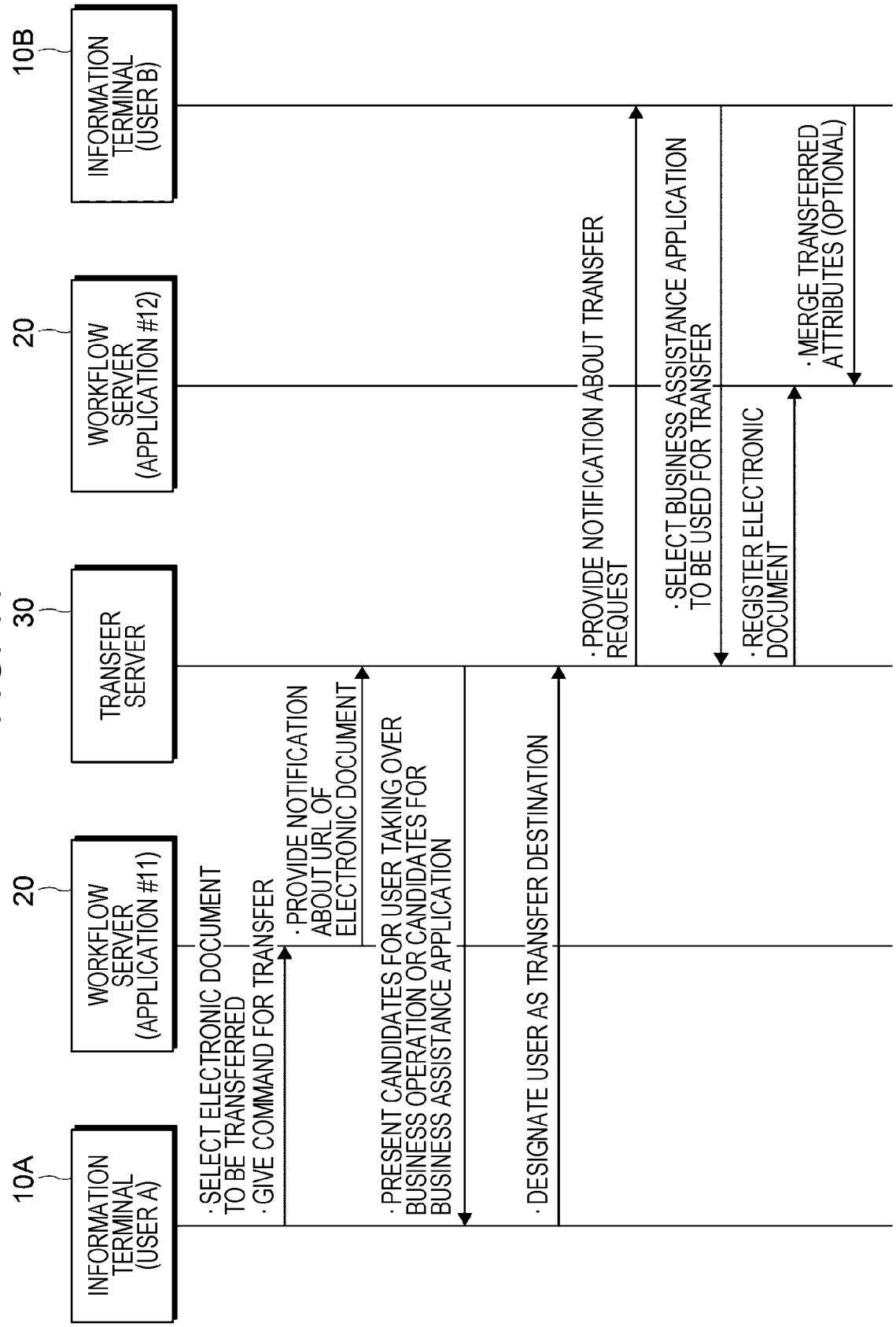

INFORMATION PROCESSING APPARATUS FOR TRANSFERRING DOCUMENT BETWEEN BUSINESS ASSISTANCE APPLICATIONS, METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-043352 filed Mar. 12, 2020.

BACKGROUND

(i) Technical Field

The present disclosure relates to information processing apparatuses and non-transitory computer readable media.

(ii) Related Art

Workflow management systems in which paper-based circulation, application, and approval processes have been computerized are being introduced to offices and business establishments. With the introduction of such a workflow management system, not only is a delay involved in delivery of paper documents resolved, but also the operational condition may be ascertained immediately and a process based on the operation history may be improved. See Japanese Patent No. 4997886 for an example.

SUMMARY

An electronic document used in an application program that assists with a user performing a business operation via a workflow (referred to as "business assistance application" or "application" hereinafter) may sometimes be desirably transferred to another business assistance application. For the sake of convenience, a user serving as a transfer source for the electronic document will be referred to as "user A", and a user serving as a transfer destination for the electronic document will be referred to as "user B". Business assistance applications that the user A is authorized to use or access will collectively be referred to as a business assistance application #1, whereas business assistance applications that the user B is authorized to use or access will collectively be referred to as a business assistance application #2.

On a screen operated by the user A for the transfer, only the business assistance application #1 that the user A is authorized to use or access is displayed as a candidate for the transfer destination. In other words, the business assistance application #2 that the user A is not authorized to use or access is not displayed on the screen operated by the user A for the transfer. In this case, the user A is not able to select, on the screen, the business assistance application #2 as a transfer destination for the electronic document handled by the business assistance application #1. As a result, the user A is not able to transfer the electronic document handled by the business assistance application #1 to the business assistance application #2.

Aspects of non-limiting embodiments of the present disclosure relate to transferability of an electronic document to an application that a user giving a command for transferring the electronic document between business assistance applications is not authorized to use.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to display information on a screen that accepts a setting of a transfer destination for an electronic document prepared in a first application that a first user is authorized to use. The information accepts selection of a second user as a candidate for the transfer destination.

BRIEF DESCRIPTION OF THE DRAWINGS

Exemplary embodiments of the present disclosure will be described in detail based on the following figures, wherein:

FIG. 11 illustrates an attribute transfer process in a case where two applications used for transferring electronic documents handle the same type of electronic document;

FIG. 12 illustrates an attribute transfer process in a case where the two applications used for transferring electronic documents handle different types of electronic documents;

FIG. 13 illustrates a transfer process in a case where a specific business assistance application is selected as a transfer destination; and FIG. 14 illustrates a transfer process in a case where a specific user is selected as a transfer destination.

DETAILED DESCRIPTION

Exemplary embodiments of the present disclosure will be described below with reference to the drawings.

Exemplary Embodiment

System Configuration

Figure 1:
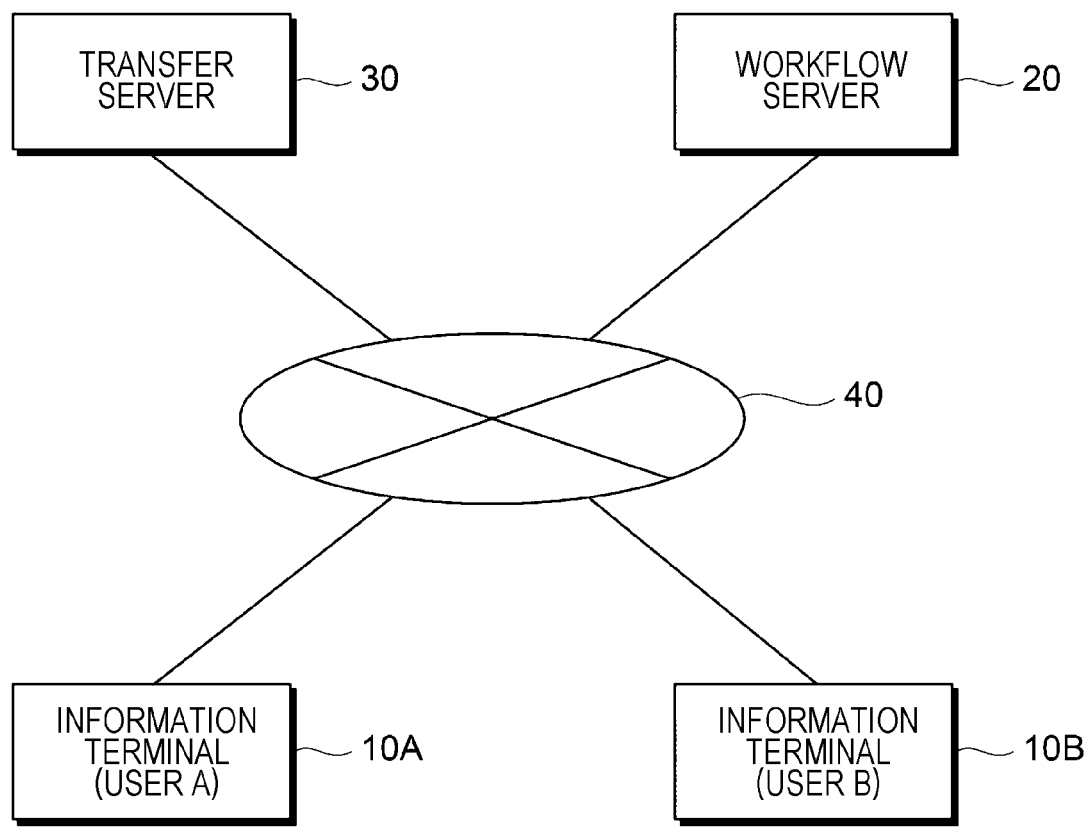
FIG. 1 illustrates a configuration example of a workflow management system used in an exemplary embodiment.

FIG. 1 illustrates a configuration example of a workflow management system 1 used in an exemplary embodiment.

The workflow management system 1 shown in FIG. 1 has information terminals 10A and 10B operated by users authorized to use a workflow, a workflow server 20 that controls the flow of a business operation defined as a workflow, and a transfer server 30 that controls the transfer of electronic documents between users or between business assistance applications.

All of these terminals are connected to a network 40. In this exemplary embodiment, the network 40 is a local area network (LAN). Alternatively, the network 40 may entirely or partially be the Internet.

In this exemplary embodiment, the term "workflow" refers to the flow of a business operation with which multiple users are involved.

The workflow in this exemplary embodiment includes steps, such as a request step, an approval step, an authorization step, and a storage step. The contents and the combination of the steps defining the workflow vary depending on the purpose for putting the workflow into practice as well as the business operator putting the workflow into practice.

Examples of electronic documents handled in the workflow include a document created with a business-related application program, an electronic mail, a document electronically converted from a paper document, a photograph, an image, and so on.

The information terminal 10A in FIG. 1 is a terminal operated by a user A serving as a transfer source, whereas the information terminal 10B is a terminal operated by a user B serving as a transfer destination. The user A and the user B in this exemplary embodiment are users of a business assistance application linked with the workflow and are permitted to use the business assistance application within an authorized range. The users are authorized not only to use the application but also to access the application.

Each of the information terminals 10A and 10B is, for example, a desktop computer, a notebook computer, a tablet computer, or a smartphone.

Although only two information terminals are shown in FIG. 1 for the sake of convenience, the number of information terminals may be three or more.

The workflow server 20 manages the delivery of electronic documents in the workflow between users, as well as the progress of processes. In this exemplary embodiment, the workflow server 20 also provides a service using the business assistance application linked with the workflow.

Examples of functions provided by the business assistance application include an attribute managing function, an attribute providing function, an electronic-document-management-related function, and an electronic-document-usage-related function.

An example of the attribute managing function is a function for extracting a title from an electronic document. An example of the attribute providing function is a function for analyzing an electronic document and inputting an attribute to a database. The term "input" used here includes addition. Examples of the electronic-document-management-related function include a function for adding a file name to an electronic document in accordance with a rule and a function for setting a folder for storing an electronic document therein in accordance with a rule. An example of the electronic-document-usage-related function is a function for transmitting an electronic document in accordance with a rule. The contents of the business assistance application vary depending on the contents of the workflow.

The transfer server 30 assists with the transfer of an electronic document between users or between business assistance applications. The transfer server 30 provides a function for assisting with a process for transferring an electronic document from a user serving as a transfer source to another business assistance application or another user. The transfer server 30 also provides a function for assisting with an electronic-document transfer process performed by a user serving as a transfer destination.

The transfer server 30 also provides a function for presenting one or more candidates for a business assistance application or a user that may serve as a transfer destination for an electronic document, a function for accepting a designation of an attribute or an attribute value for permitting usage at a transfer destination, and a function for notifying an unspecified user operating a specific business assistance application or a specific user designated as a transfer destination that an electronic document to be transferred exists.

The transfer server 30 according to this exemplary embodiment is an example of an information processing apparatus.

As an alternative to this exemplary embodiment in which the workflow server 20 and the transfer server 30 are described as being servers independent of each other, the functions of the workflow server 20 and the transfer server 30 may be executed as functions of a single server.

As an alternative to the case of FIG. 1 in which the workflow server 20 and the transfer server 30 are connected to the same network 40, the linkage therebetween may be realized using different networks.

Furthermore, as an alternative to the workflow management system 1 shown in FIG. 1 that has a single workflow server 20 and a single transfer server 30, each server may achieve its function by having multiple servers operating in cooperation with each other.

Configuration of Workflow Server

Figure 2:
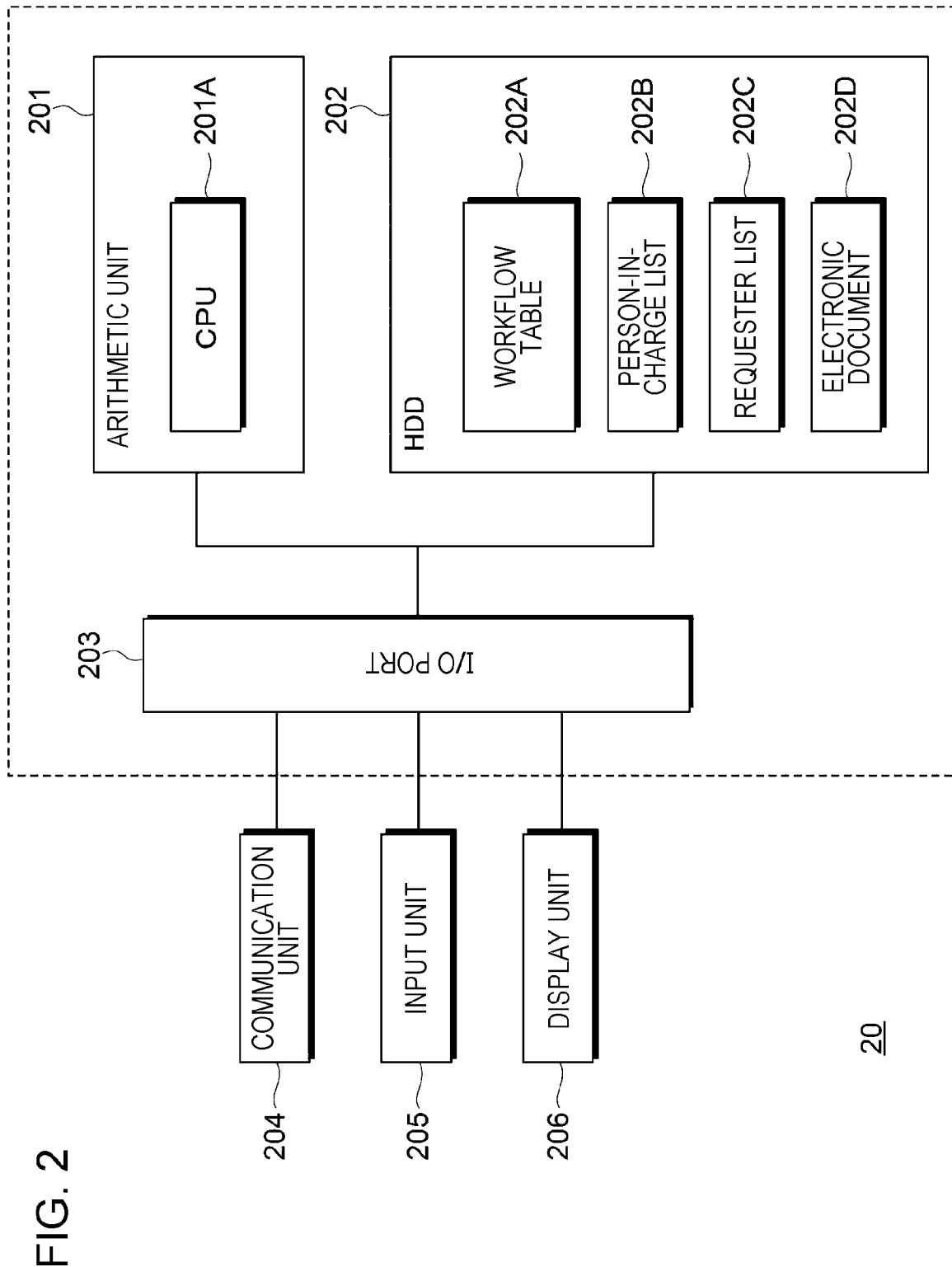
FIG. 2 illustrates a configuration example of a workflow server used in the exemplary embodiment.

FIG. 2 illustrates a configuration example of the workflow server 20 used in this exemplary embodiment.

The workflow server 20 shown in FIG. 2 has an arithmetic unit 201 that controls the operation of the entire apparatus, a hard disk drive (HDD) 202, an input/output (I/O) port 203, a communication unit 204 that realizes communication with an external apparatus, an input unit 205 used for inputting, for example, a command, and a display unit 206 used for displaying information. These units are connected by various types of signal lines.

The arithmetic unit 201 has a central processing unit (CPU) 201A as an example of a processor. The arithmetic unit 201 is also provided with, for example, a read-only memory (ROM) having a basic input output system (BIOS) stored therein, and a random access memory (RAM) used as a work area.

The arithmetic unit 201 is a so-called computer that provides various types of functions by executing programs.

The HDD 202 is a device that drives a magnetic disk serving as a nonvolatile storage medium, and is used as a database that stores therein various types of data related to the management of the workflow. In the case of FIG. 2, examples of the data stored in the HDD 202 include a workflow table 202A, a person-in-charge list 202B, a requester list 202C, and an electronic document 202D.

The workflow table 202A has stored therein various types of data used for managing the workflow. The various types of data include, for example, the history of processes executed in the past. The history of processes include, for each process, an attribute related to the user performing the process, an electronic document having undergone the process, and the contents of the process.

The person-in-charge list 202B is a list of users authorized to use the workflow. The user A and the user B mentioned above are also managed using the person-in-charge list 202B.

The requester list 202C is a list of users who have made requests for approval of electronic documents. The data in the requester list 202C is updated every time a request is received.

The electronic document 202D is an electronic document handled in the workflow.

In the HDD 202, information about whether or not each user is authorized to use a business assistance application and information about whether or not each user is authorized to access a business assistance application are also managed.

In addition, the HDD 202 has also stored therein other application programs, such as an application for managing the workflow and a business assistance application linked with the workflow.

Configuration of Transfer Server

Figure 3:
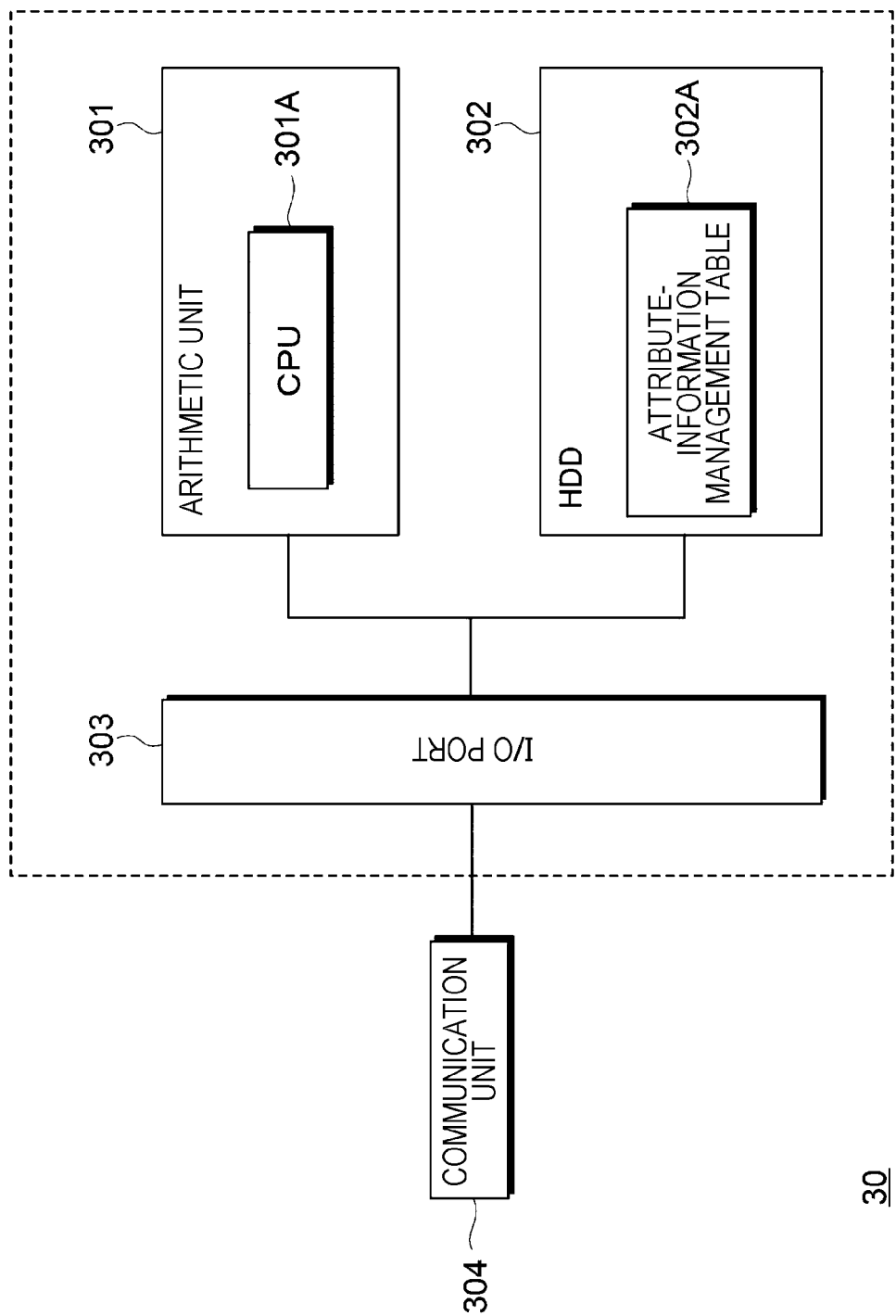
FIG. 3 illustrates a configuration example of a transfer server used in the exemplary embodiment.

FIG. 3 illustrates a configuration example of the transfer server 30 used in this exemplary embodiment.

The transfer server 30 shown in FIG. 3 has an arithmetic unit 301 that controls the operation of the entire apparatus, an HDD 302, an I/O port 303, and a communication unit 304 that realizes communication with an external apparatus. These units are connected by various types of signal lines.

The arithmetic unit 301 has a CPU 301A as an example of a processor. The arithmetic unit 301 is also provided with, for example, a ROM having a BIOS stored therein, and a RAM used as a work area.

The arithmetic unit 301 is a so-called computer that provides various types of functions by executing programs.

The HDD 302 is a device that drives a magnetic disk serving as a nonvolatile storage medium, and is used as a database that stores therein various types of data.

In the case of FIG. 3, a table (referred to as "attribute-information management table" hereinafter) 302A used for managing attribute information to be presented to a user serving as a candidate for a transfer destination is shown as one example of the various types of data.

The attribute-information management table 302A has stored therein the relationship between users and attributes extracted from the history of processes performed in the past. The history of processes performed in the past is acquired from the workflow table 202A (see FIG. 2).

Transfer Process

A business handover involving delivery of one or more electronic documents will be described below with reference to FIGS. 4 to 16.

Figure 4:
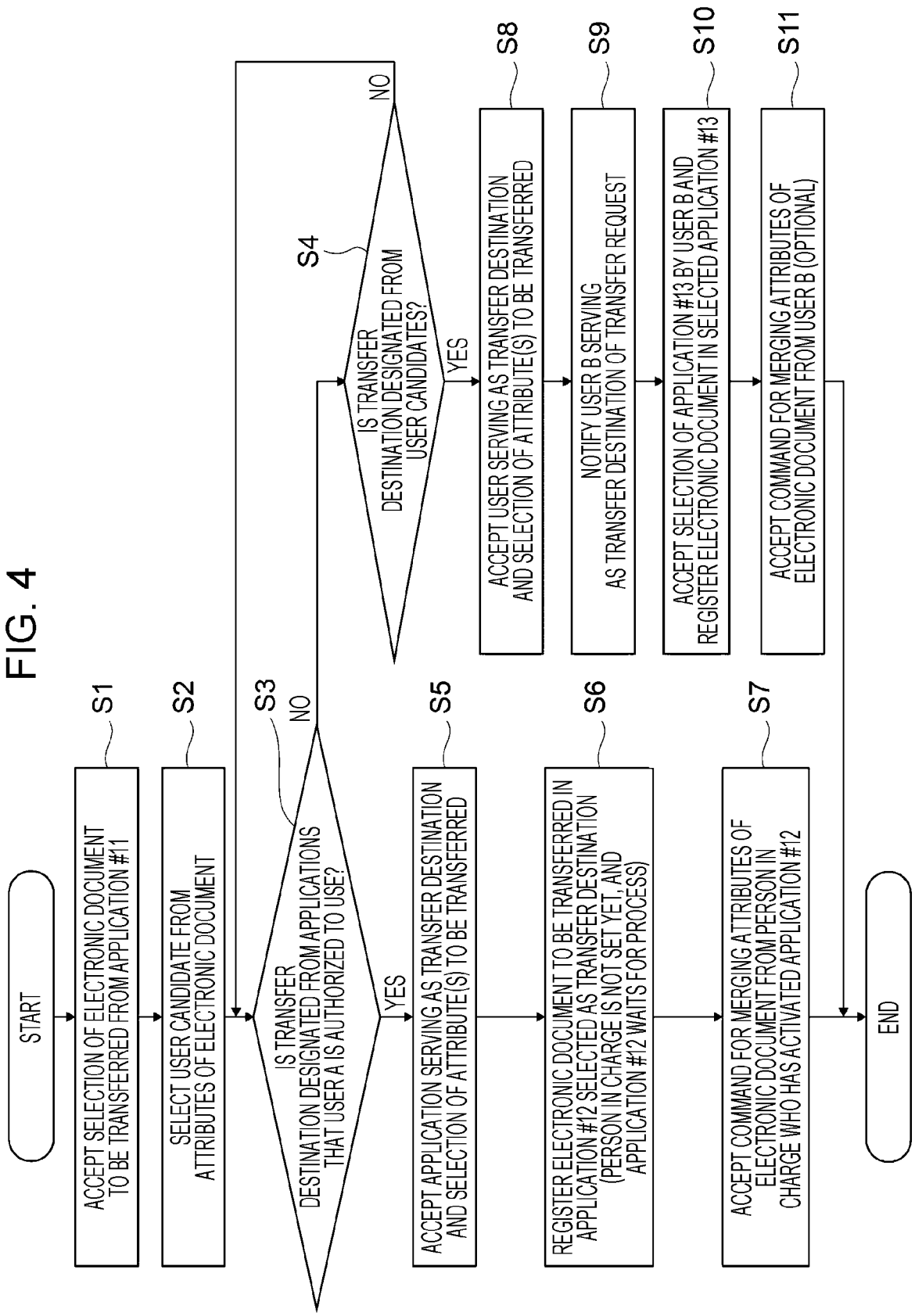
FIG. 4 is a flowchart illustrating an example of an electronic-document transfer process executed by the workflow server and the transfer server operating in cooperation with each other.

FIG. 4 is a flowchart illustrating an example of an electronic-document transfer process executed by the workflow server 20 and the transfer server 30 operating in cooperation with each other. Reference sign S shown in FIG. 4 indicates a step.

In FIG. 4, a user handing over a business is defined as a user A. A business assistance application used by the user A for electronic-document transfer settings is defined as an application #11. The user A is authorized to use the application #11.

A business assistance application selected as a transfer destination by the user A and used by a user taking over the business operation is defined as an application #12. The user A is also authorized to use the application #12. Because the user A is authorized to use the application #12, the user A is capable of selecting the application #12.

A user designated as a transfer destination by the user A is defined as a user B. A business assistance application selected by the user B for processing an electronic document is defined as an application #13. The user B is authorized to use the application #13. The user A may sometimes be authorized or may sometimes be not authorized to use the application #13.

The user A is an example of a first user, whereas the user B is an example of a second user. The application #11 and the application #12 each are an example of a first application, whereas the application #13 is an example of a second application.

In step S1, the workflow server 20 accepts, from the application #11, selection of one or more electronic documents to be transferred from the information terminal 10A (see FIG. 1).

Figure 5:
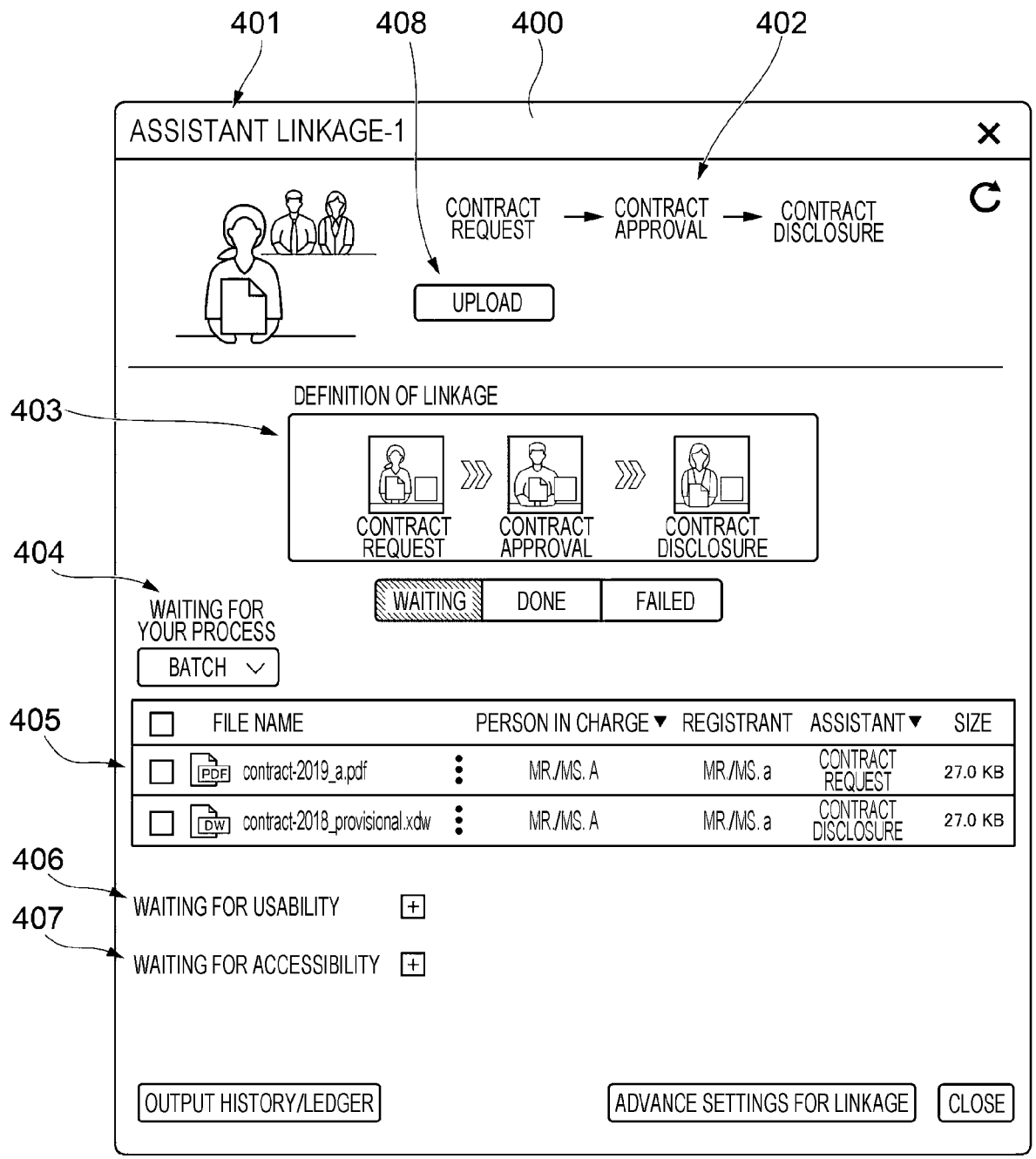
FIG. 5 illustrates an example of a screen that accepts selection of an electronic document to be transferred.

FIG. 5 illustrates an example of a screen 400 that accepts selection of one or more electronic documents to be transferred. The screen 400 is displayed on a display unit of the information terminal 10A operated by the user A handing over the business operation. A title 401 that reads "assistant linkage-1" is displayed at the upper left corner of the screen 400. The "assistant linkage-1" corresponds to the application #11 in FIG. 4.

An "assistant" is also known as a business assistance application. A business assistance application is given a name according to the contents of a business operation to be assisted. The "assistant linkage-1" indicates an application used for transferring an electronic document between business assistance applications.

A processing flow 402 in the workflow linked with the "assistant linkage-1" is shown at the upper part of the screen 400. In the case of FIG. 5, a workflow related to a contract request is indicated in the processing flow 402.

A linkage definition 403 in the "assistant linkage-1" and a current processing stage 404 are shown at the middle of the screen 400. In the example in FIG. 5, a state of "waiting" for a process by the user A is indicated by using both an icon and text.

A selection field 405 for one or more electronic documents to be transferred is disposed at the lower part of the screen 400. The selection field 405 shown in FIG. 5 indicates five attributes, namely, a file name, a person in charge, a registrant, an assistant, and a size. These attributes are examples. Therefore, another attribute may be displayed in the selection field 405. Moreover, there may be one or more of these attributes that are not displayed.

In the case of FIG. 5, two selectable files of electronic documents are shown. In the case of FIG. 5, both checkboxes are blank. When any of the checkboxes is checked, the corresponding electronic document is selected as a transfer target.

A "waiting for usability" display field 406 and a "waiting for accessibility" display field 407 are also disposed at the lower part of the screen 400.

In the case of FIG. 5, when an electronic document is selected and an upload button 408 is operated, information about the attributes and the storage location of the selected electronic document is transmitted to the transfer server 30.

Referring back to FIG. 4, when the information about the selection of the one or more electronic documents by the user A is accepted from the information terminal 10A, the transfer server 30 selects a user candidate from the attributes of the one or more electronic documents in step S2. This is executed as preprocessing for presenting the user candidate serving as a transfer destination to the user A.

The transfer server 30 selects a user linked with the attributes of the selected electronic document as a transfer candidate. For the selection, for example, the history of processes in the past and an affiliation with the user A are also used.

In step S3, the workflow server 20 determines whether or not the transfer destination has been designated from applications that the user A is authorized to use. If a negative result is obtained in step S3, the workflow server 20 determines in step S4 whether or not the transfer destination has been designated from user candidates. If a negative result is obtained in step S4, the workflow server 20 returns to step S3.

The determination processes in step S3 and step S4 are repeated until the information for setting the transfer destination is reported from the information terminal 10A operated by the user A to the workflow server 20.

Figure 6:
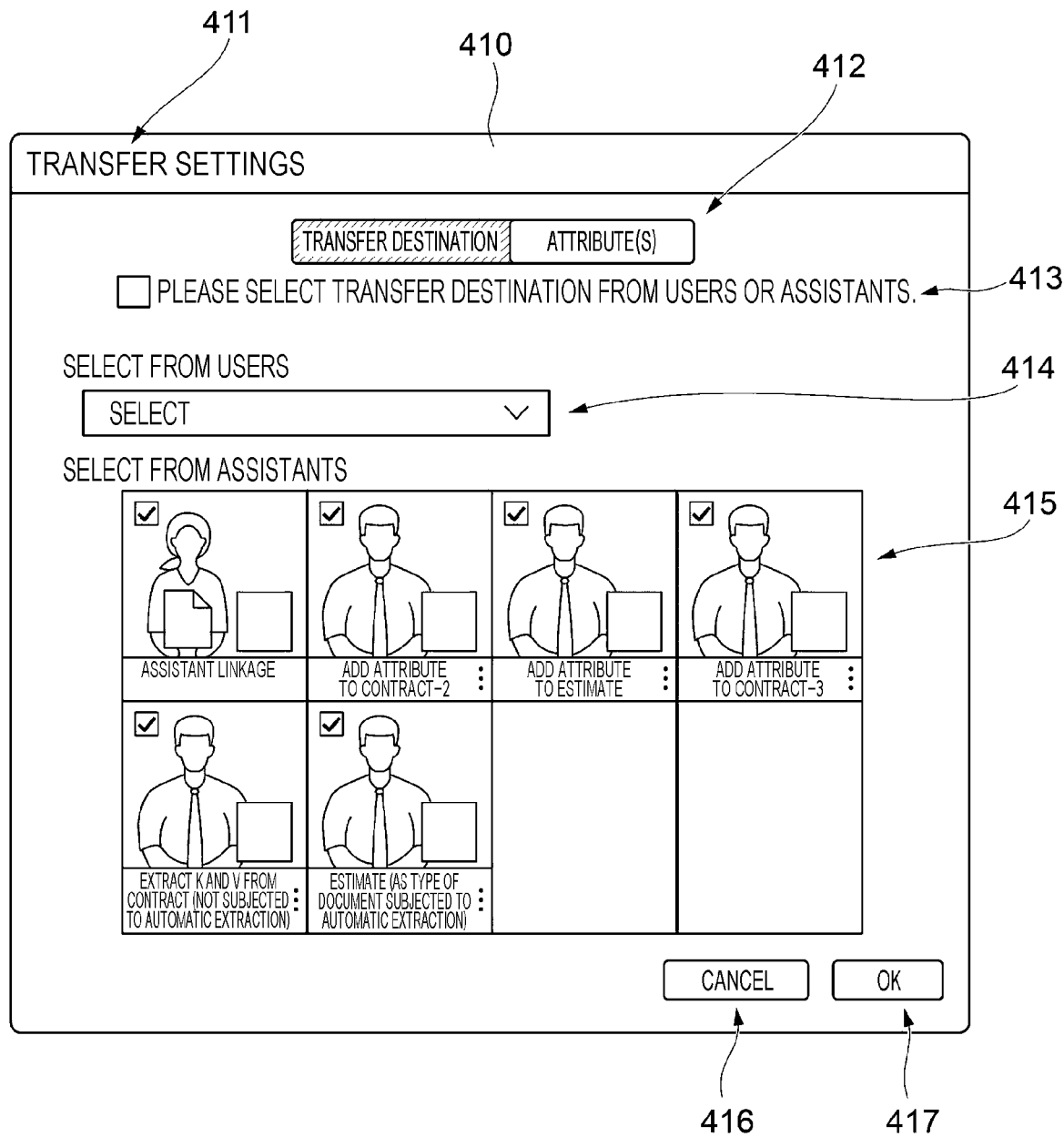
FIG. 6 illustrates an example of a screen that accepts selection of a transfer destination.

FIG. 6 illustrates an example of a screen 410 that accepts selection of a transfer destination.

The screen 410 shown in FIG. 6 is also displayed on the display unit of the information terminal 10A operated by the user A handing over the business operation.

A title 411 that reads "transfer settings" is displayed at the upper left corner of the screen 410.

A display field 412 indicating a current transfer target is displayed below the title 411. In the case of FIG. 6, the transfer settings are possible for two types, namely, a transfer destination and attributes. Since the screen 410 shown in FIG. 6 is used for selecting a transfer destination, the option "transfer destination" is highlighted in the display field 412.

Descriptive text 413 asking the user A for an operation is displayed below the display field 412. In this exemplary embodiment, a user may be designated as a transfer destination, or a business assistance application may be designated as a transfer destination. Therefore, the descriptive text 413 reads "please select transfer destination from users or assistants". In this case, an assistant is a business assistance application.

In the case of the screen 410, a user selection field 414 is displayed below the descriptive text 413, and a business-assistance-application selection field 415 is displayed below the selection field 414.

In the case of FIG. 6, the selection field 414 is shown in a state before a pull-down menu is opened.

The business-assistance-application selection field 415 displays a list of icons for business assistance applications that the user A is authorized to use. In other words, icons for business assistance applications that the user A is not authorized to use are not displayed in the selection field 415. For example, if the user A has no authorization for approval, an icon for an approval-related business assistance application is not displayed in the selection field 415. Thus, the user A is not able to select, as a transfer destination, a business assistance application used by a user who approves a request from the user A.

In the case of FIG. 6, an icon prepared for collectively selecting all linkable business assistance applications, an icon for a business assistance application used for adding an attribute to a contract document, an icon for a business assistance application used for adding an attribute to an estimate sheet, and an icon for a business assistance application used for adding an attribute to a contract document are arranged from left to right at the upper level of the selection field 415.

Furthermore, an icon for a business assistance application used for extracting a key (K) and a value (V) from a contract document not subjected to automatic extraction and an icon for a business assistance application for processing an estimate sheet as a type of a document subjected to automatic extraction are arranged from left to right at the lower level of the selection field 415.

In the selection field 415 shown in FIG. 6, a checkbox for the icon located at the left end of the upper level is checked. Therefore, checkboxes for all of the icons arranged in the selection field 415 are checked. Needless to say, the icons may be selected individually.

At the lowest part of the screen 410, a button 416 for cancelling the selection and a button 417 for confirming the selection are disposed.

Three of the icons at the upper level are each given a series of three dots. When the series of three dots is operated, basic information about the business assistance application corresponding to each icon is displayed.

When the button 417 is operated, information about the settings of the transfer destination selected on the screen 410 is transmitted to the transfer server 30. When the button 417 is operated, the display unit of the information terminal 10A displays a screen that accepts attribute-related transfer settings.

Figure 7:
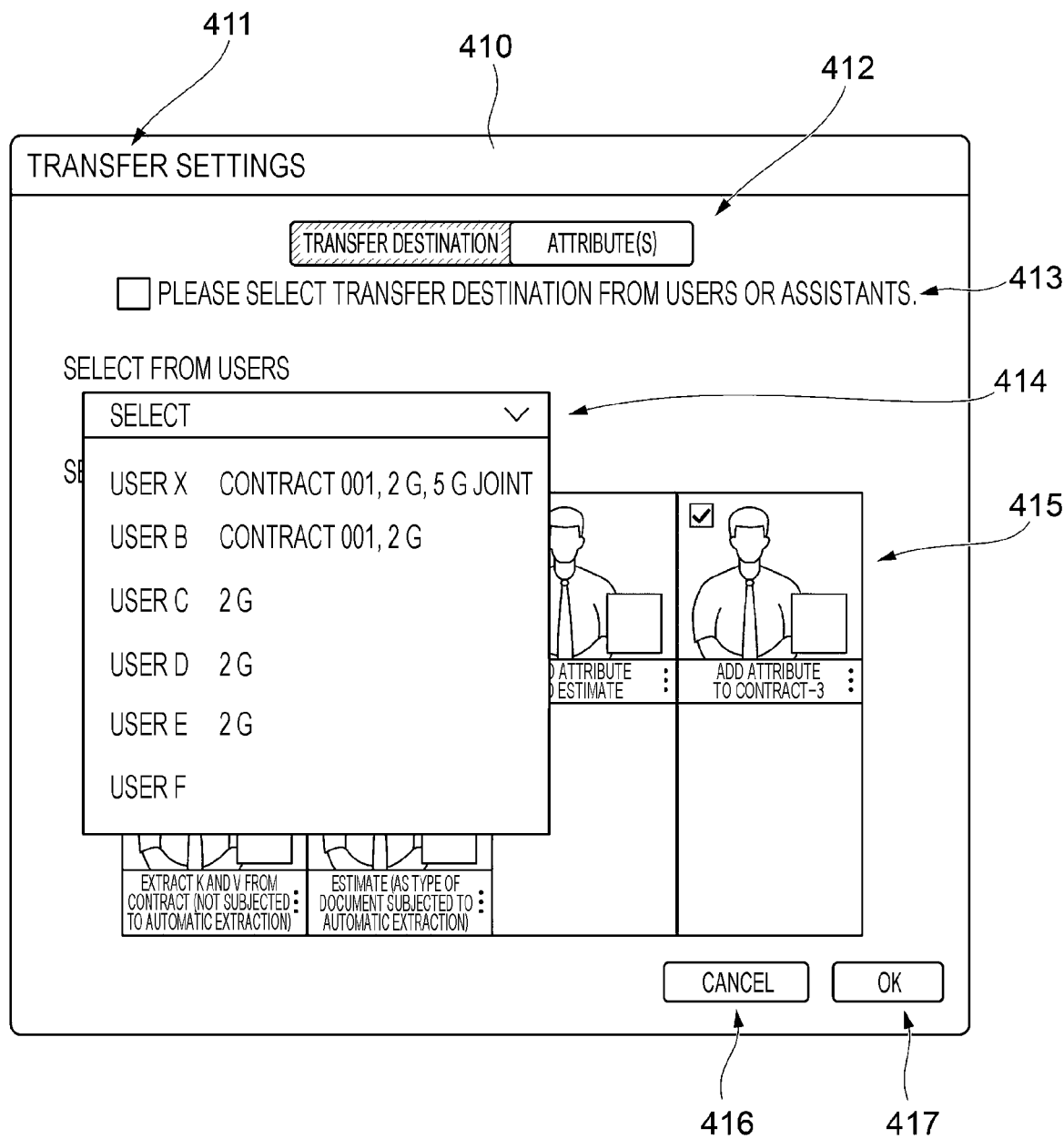
FIG. 7 illustrates an example of a screen that accepts selection of a transfer destination.

FIG. 7 illustrates another example of the screen 410 that accepts selection of a transfer destination. In FIG. 7, sections corresponding to those in FIG. 6 are given corresponding reference signs.

The screen 410 in FIG. 7 is shown in a state where a pull-down button of the user's selection field 414 has been operated. In the case of FIG. 7, the pull-down menu displays a list of selectable user candidates and one or more user attributes that may overlap with one or more attributes attached to a selected electronic document.

In the case of FIG. 7, a user X, a user B, a user C, a user D, a user E, and a user F are indicated as user candidates. For example, with regard to the user X, "contract 001", "2 G", and "5 G joint" are indicated as overlapping attributes. With regard to the user B, "contract 001" and "2 G" are indicated as overlapping attributes. With regard to the user F, the attribute information is blank since there are no overlapping attributes.

In the case of FIG. 7, the user candidates are displayed such that users with a larger number of overlapping attributes are ranked higher.

In this exemplary embodiment, a user and a business assistance application are both selectable as transfer destinations. However, in a case where a user and a business assistance application are both selected as transfer destinations, the transfer server 30 prioritizes the business assistance application set as a transfer destination. In this case, the transfer server 30 processes the specific simultaneously-selected user as a person in charge who is to take over the business operation.

Referring back to FIG. 4, if a business assistance application is selected as a transfer destination on the screen 410, the workflow server 20 obtains a positive result in step S3 and proceeds to step S5. In contrast, if a user is selected as a transfer destination on the screen 410, the workflow server 20 obtains a positive result in step S4 and proceeds to step S8.

In step S5, the workflow server 20 accepts the application serving as the transfer destination and the selection of one or more attributes to be transferred. The accepted selection is reported to the transfer server 30.

In contrast, in step S8, the workflow server 20 accepts the user serving as the transfer destination and the selection of one or more attributes to be transferred. In this case, the accepted selection is similarly reported to the transfer server 30.

Figure 8:
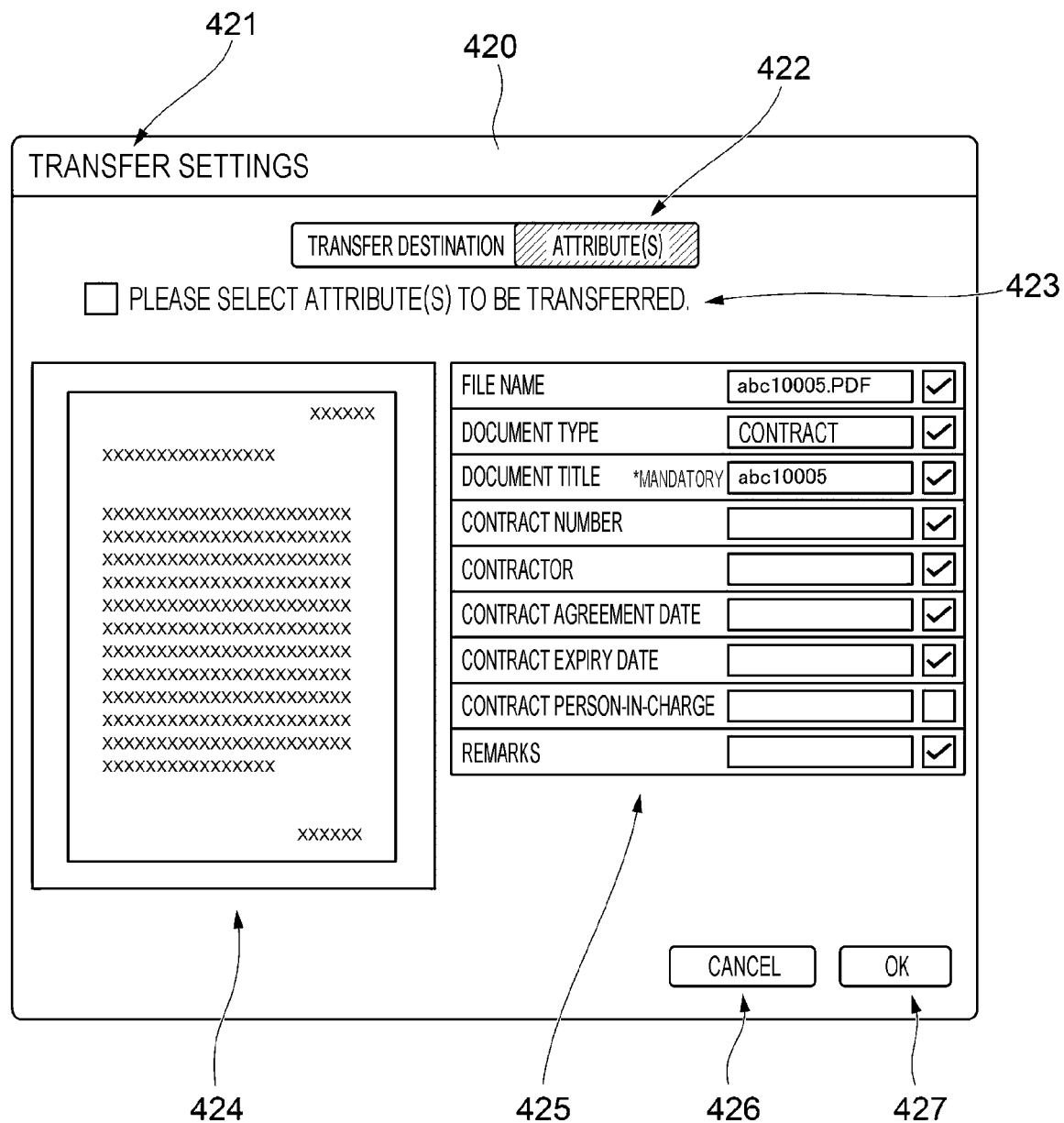
FIG. 8 illustrates an example of a screen that accepts settings for attributes to be transferred.

FIG. 8 illustrates an example of a screen 420 that accepts the settings of one or more attributes to be transferred.

The screen 420 shown in FIG. 8 is similarly displayed on the display unit of the information terminal 10A operated by the user A handing over the business operation.

A title 421 that reads "transfer settings" is displayed at the upper left corner of the screen 420.

A display field 422 indicating a current transfer target is displayed below the title 421. In the case of FIG. 8, the transfer settings involve selection of one or more attributes. Thus, the option "attribute(s)" is highlighted in the display field 422.

Descriptive text 423 asking the user A for an operation is displayed below the display field 422. The descriptive text 423 in FIG. 8 reads "please select attribute(s) to be transferred".

In the case of the screen 420, a display field 424 used for checking an image of an electronic document to be transferred and a selection field 425 for one or more attributes to be transferred are disposed below the descriptive text 423.

In the case of FIG. 8, the electronic document to be transferred has a file name "abc10005.PDF". Other attributes displayed are "document type", "document title", "contract number", "contractor", "contract agreement date", "contract expiry date", "contract person-in-charge", and "remarks".

Each of the attributes is provided with a checkbox. When the checkbox is checked, the corresponding attribute becomes a transfer target. In the case of FIG. 8, attributes other than the contract person-in-charge are set as targets to be transferred.

At the lowest part of the screen 420, a button 426 for cancelling the selection and a button 427 for confirming the selection are disposed.

Referring back to FIG. 4, the contents of the process performed by the transfer server 30 having accepted the settings for the one or more attributes to be transferred vary between when a business assistance application is selected as a transfer destination and when a user is selected as a transfer destination.

First, in step S6, if a business assistance application is selected as a transfer destination, the transfer server 30 registers an electronic document to be transferred in the application #12 selected as a transfer destination. At this stage, a person-in-charge who is to take over the business operation by using the application #12 is not set yet. Moreover, the application #12 waits for a process to be performed by an unset person-in-charge.

In step S7, the workflow server 20 accepts a command for merging the attributes of the electronic document from a person-in-charge who has activated the application #12. In this exemplary embodiment, the term "merge" refers to adjusting the correspondence relationship between the attributes in an integrated manner such that the correspondence relationship complies with a rule for the management of attributes by the application #12 selected by the person-in-charge who is to take over the business operation.

In this case, the person-in-charge confirms one or more missing attributes from, for example, the screen of the application #12 displayed on the display unit of the information terminal 10B. A specific example of the merging-related process will be described later.

If a user is selected as a transfer destination, the transfer server 30 transmits a notification of a transfer request to the user B serving as the transfer destination in step S9. The notification in this case involves the use of, for example, an electronic mail. In this exemplary embodiment, the electronic mail contains information indicating that the user A has designated the user B as a user taking over the business operation as well as information related to the storage location of the electronic document to be transferred. The storage location is given by using, for example, a uniform resource locator (URL).

In step S10, the transfer server 30 accepts selection of the application #13 by the user B and registers the electronic document in the selected application #13. The application #13 is selected from business assistance applications that the user B is authorized to use.

Figure 9:
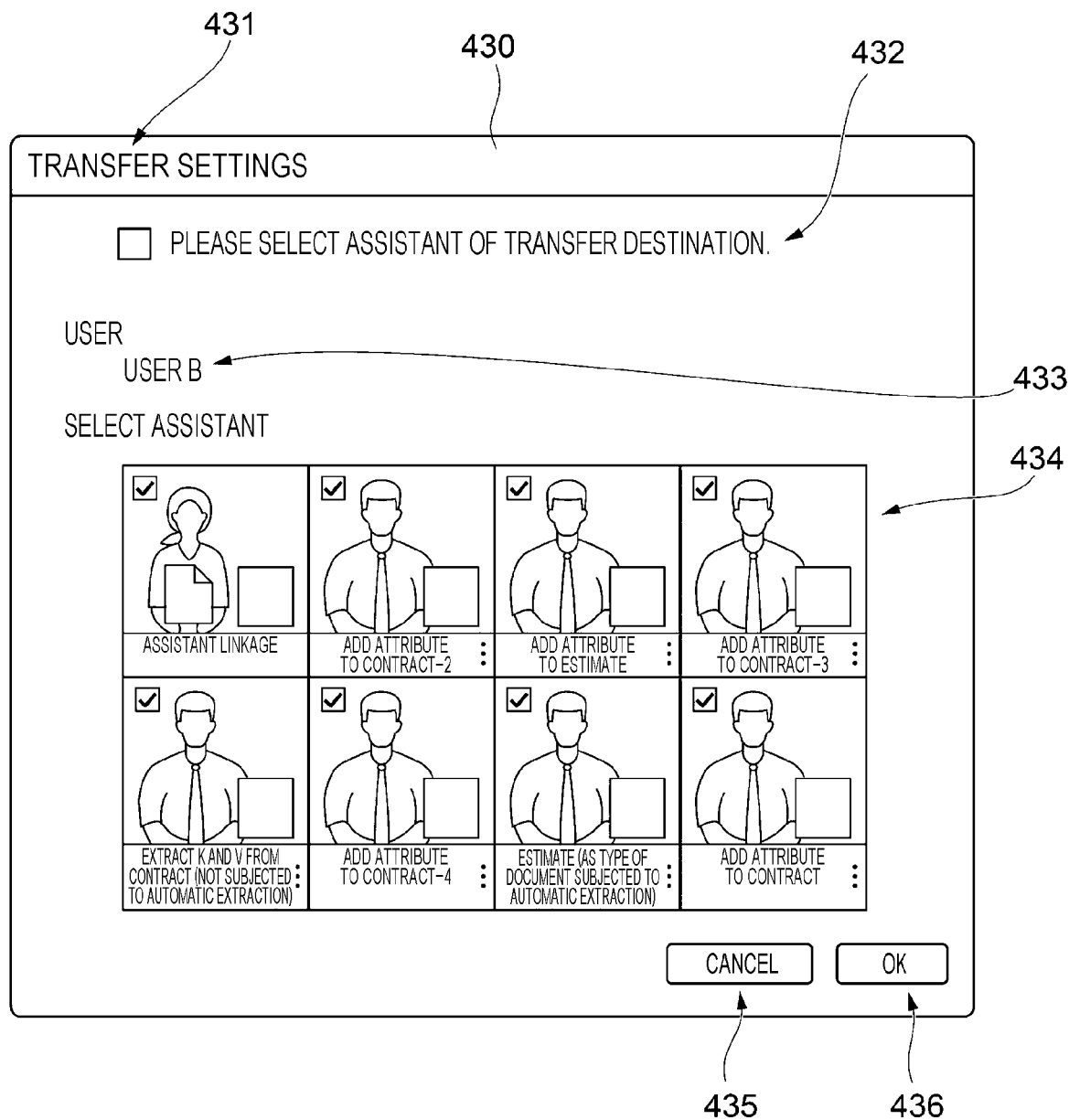
FIG. 9 illustrates an example of a screen used for transfer settings by a user taking over a business operation.

FIG. 9 illustrates an example of a screen 430 used for the transfer settings by the user B taking over the business operation.

The screen 430 shown in FIG. 9 is displayed on the display unit of the information terminal 10B operated by the designated user B taking over the business operation. For example, the screen 430 is displayed as a result of executing a business assistance application prepared for a business handover.

A title 431 that reads "transfer settings" is displayed at the upper left corner of the screen 430.

Descriptive text 432 asking the user B for an operation is displayed below the title 431. In this exemplary embodiment, the descriptive text 432 reads "please select assistant of transfer destination". As mentioned above, an assistant is a business assistance application.

In the case of the screen 430, an information field 433 indicating a user performing an operation is displayed below the descriptive text 432. In the information field 433 shown in FIG. 9, "user B" is displayed.

A business-assistance-application selection field 434 is displayed below the information field 433.

In the case of FIG. 9, an icon prepared for collectively selecting all linkable business assistance applications, an icon for a business assistance application used for adding an attribute to a contract document, an icon for a business assistance application used for adding an attribute to an estimate sheet, and an icon for a business assistance application used for adding an attribute to a contract document are similarly arranged from left to right at the upper level of the selection field 434.

Furthermore, an icon for a business assistance application used for extracting a key (K) and a value (V) from a contract document not subjected to automatic extraction, an icon for a business assistance application used for adding an attribute to a contract document, an icon for a business assistance application for processing an estimate sheet as a type of a document subjected to automatic extraction, and an icon for a business assistance application used for adding an attribute to an invoice are arranged from left to right at the lower level of the selection field 434.

The icons are arranged such that icons with a larger number of overlapping attributes with the electronic document are ranked higher. In the case of FIG. 9, the upper level is ranked higher than the lower level, and the left end is ranked higher than the right end.

In FIG. 9, each of the icons is given a series of three dots. When the series of three dots is operated, basic information about the business assistance application corresponding to each icon is displayed.

At the lowest part of the screen 430, a button 435 for cancelling the selection and a button 436 for confirming the selection are disposed.

Referring back to FIG. 4, when the user B selects the application #13 used for processing the electronic document, the electronic document to be transferred is registered in the selected application #13.

In step S11, the workflow server 20 accepts a command for merging the attributes of the electronic document from the user B. Step S11 is executed only when the command is given by the user B. In other words, the execution of step S11 is optional.

The attribute merging process executed in step S7 and step S11 will be described below. When a business operation is to be handed over, if business assistance applications are different from each other, the business operation may be handled by one of the business assistance applications but may be not handled by the other business assistance application. Furthermore, even if an attribute may be handled in any of the business assistance applications, the attribute may be deletable or not deletable in a certain business assistance application.

Moreover, depending on the user processing the electronic document, the user may be not permitted to check a specific attribute.

Therefore, the attribute merging process is executed in step S7 and step S11.

Figure 10:
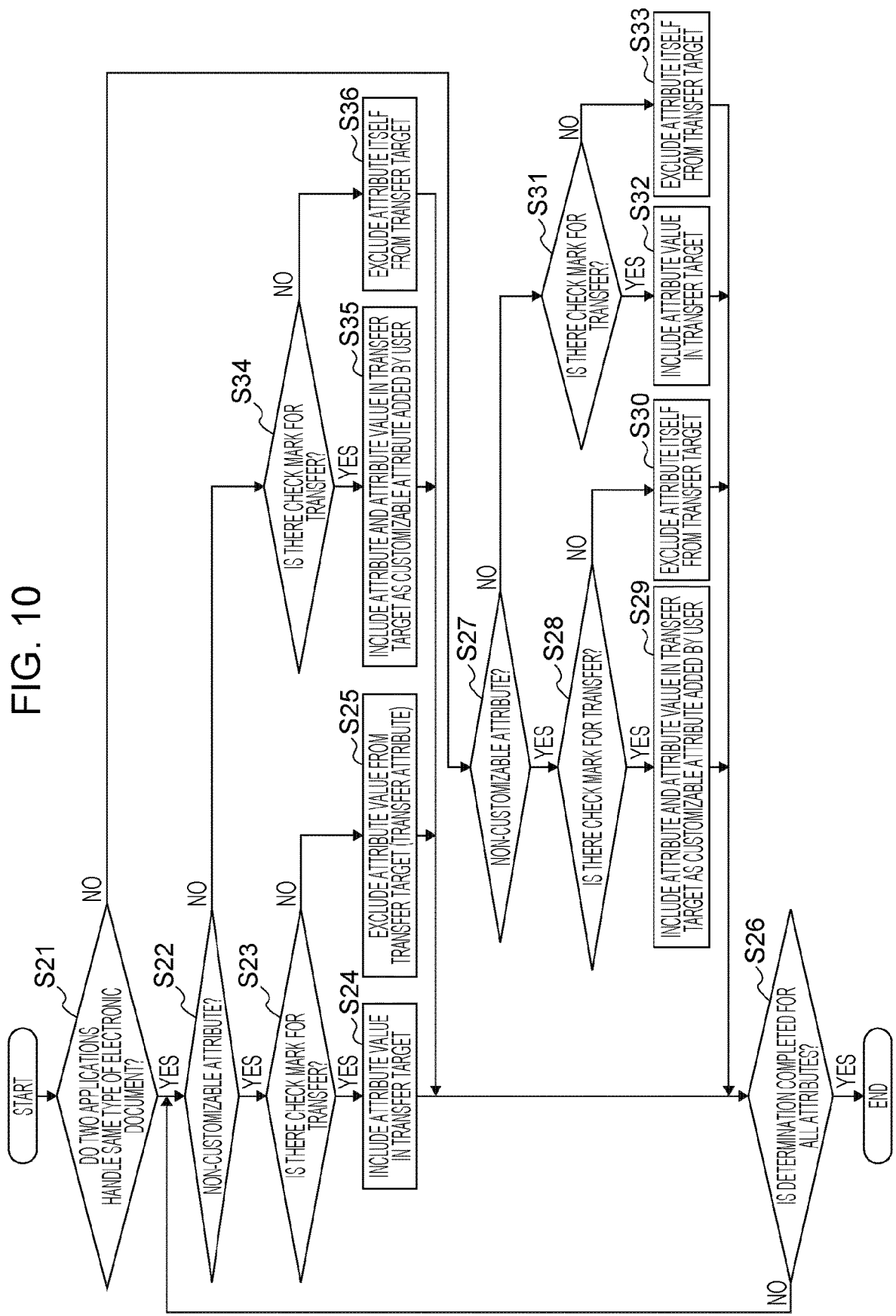
FIG. 10 is a flowchart illustrating an example of an attribute merging process.

FIG. 10 is a flowchart illustrating an example of the attribute merging process. Reference sign S shown in FIG. 10 indicates a step.

First, the merging process is executed by the business assistance application to which the electronic document is transferred. In detail, in step S21, the workflow server 20 executing the business assistance application at the transfer destination determines whether or not the type of electronic document handled by two applications is the same.

In the case of step S7, the two applications are the application #11 and the application #12. In the case of step S11, the two applications are the application #11 and the application #13.

If the type of electronic document handled by the two applications is the same, the workflow server 20 obtains a positive result in step S21. In this case, the workflow server 20 determines in step S22 whether or not each of the attributes attached to the electronic document to be transferred is a non-customizable attribute.

A non-customizable attribute is an attribute not freely deletable by a user. On the other hand, a customizable attribute is an attribute freely deletable by a user.

If each of the attributes is a non-customizable attribute, the workflow server 20 obtains a positive result in step S22. In this case, the workflow server 20 determines in step S23 whether or not the attribute serving as a determination target is given a check mark for transfer.

If a positive result is obtained in step S23, the workflow server 20 incorporates an attribute value into the transfer target in step S24. In this case, since the attribute designated as a transfer target is a non-customizable attribute, the attribute value is directly transferred.

If a negative result is obtained in step S23, the workflow server 20 excludes the attribute value from the transfer target in step S25. However, since the attribute is a non-customizable attribute, the attribute itself is transferred.

When step S24 or step S25 is executed, the workflow server 20 determines in step S26 whether or not the determination has been completed for all the attributes. In this case, all the attributes are all attributes attached to the electronic document to be transferred.

If a positive result is obtained in step S26, the workflow server 20 ends the attribute merging process.

In contrast, if a negative result is obtained in step S26, the transfer server 30 returns to step S22.

The following description relates to a case where the two applications handle different types of electronic documents.

In this case, the workflow server 20 obtains a negative result in step S21. In step S27, the workflow server 20 determines whether or not each of the attributes attached to the electronic document to be transferred is a non-customizable attribute.

If each of the attributes is a non-customizable attribute, the workflow server 20 obtains a positive result in step S27. In this case, the workflow server 20 determines in step S28 whether or not the attribute serving as a determination target is given a check mark for transfer.

If a positive result is obtained in step S28, the workflow server 20 incorporates the attribute and the attribute value as a customizable attribute (referred to as "custom attribute" hereinafter) added by the user into the transfer target in step S29. This is because the content of a non-customizable attribute varies if the type of electronic document handled by the business assistance application used for the transfer varies. On the other hand, the attribute for which a positive result is obtained in step S28 is a transfer target. Therefore, the workflow server 20 manages the relevant attribute as a custom attribute added by the user.

If a negative result is obtained in step S28, the workflow server 20 excludes the attribute itself from the transfer target in step S30. Since the attribute in this case is a non-customizable attribute, the existence of the attribute itself is transferred.

When step S29 or step S30 is executed, the workflow server 20 proceeds to step S26.

If a negative result is obtained in step S27, the workflow server 20 determines in step S31 whether or not a check mark for transfer is given. The attribute serving as a determination target in this case is a customizable attribute.

If a positive result is obtained in step S31, the workflow server 20 incorporates the attribute value with respect to the customizable attribute into the transfer target in step S32.

If a negative result is obtained in step S31, the workflow server 20 excludes the attribute itself from the transfer target in step S33. This is because the relevant attribute is a customizable attribute and has highly optionality.

When step S32 or step S33 is executed, the workflow server 20 proceeds to step S26.

The following description relates to a case where the two applications handle the same type of electronic document but the relevant attribute is a customizable attribute.

In this case, the workflow server 20 obtains a negative result in step S22. In step S34, the workflow server 20 determines whether or not the relevant attribute is given a check mark for transfer.

If a positive result is obtained in step S34, the workflow server 20 incorporates the attribute and the attribute value as a customizable attribute added by the user into the transfer target in step S35.

If a negative result is obtained in step S34, the workflow server 20 excludes the attribute itself from the transfer target in step S36.

When step S35 or step S36 is executed, the workflow server 20 proceeds to step S26.

FIG. 11 illustrates an attribute transfer process in a case where the two applications used for transferring electronic documents handle the same type of electronic document.

Since the electronic document handled is of the same type, an attribute handled by the application #11 serving as a transfer source and an attribute handled by the application #12 or #13 serving as a transfer destination are identical to each other.

In this case, with regard to non-customizable attributes, only the attribute value of an attribute that is given a check mark for transfer is transferred, whereas the attribute value of an attribute that is not given a check mark is not transferred.

With regard to customizable attributes, only the attribute value of an attribute that is given a check mark for transfer is transferred, whereas an attribute that is not given a check mark is not transferred. In detail, a "custom attribute 5 added by user" is not transferred to the application #12 or #13.

FIG. 12 illustrates an attribute transfer process in a case where the two applications used for transferring electronic documents handle different types of electronic documents.

Since different types of electronic documents are handled, an attribute handled by the application #11 serving as a transfer source and an attribute handled by the application #12 or #13 serving as a transfer destination are different from each other.

In FIG. 12, a difference between a non-customizable attribute handled by the application #11 and a non-customizable attribute handled by the application #12 or #13 is expressed with different numerical values added as a suffix to attribute names.

Of non-customizable attributes handled by the application #11, attributes each given a check mark for transfer are transferred together with attribute values included therein as "custom attribute 7 added by user" and "custom attribute 8 added by user".

With regard to customizable attributes, only the attribute value of an attribute that is given a check mark for transfer is transferred, whereas the attribute value of an attribute that is not given a check mark is not transferred.

In this case, newly-added custom attributes 7 and 8 are merged with existing custom attributes 4 and 6.

The following description relates to a difference in information delivered between terminals due to different transfer destinations.

FIG. 13 illustrates a transfer process in a case where a specific business assistance application is selected as a transfer destination.

First, the user A uses the information terminal 10A to operate the application #11 that assists with the transfer of electronic documents in the workflow, and to select an electronic document to be transferred. The URL of the selected electronic document is reported to the transfer server 30 from the application #11.

The transfer server 30 uses information about one or more attributes attached to the electronic document and presents candidates for a user taking over the business operation or candidates for a business assistance application on the information terminal 10A. The candidates for a business assistance application are limited to business assistance applications that the user A is authorized to use.

In this case, a business assistance application is designated as a transfer destination. Information about the designated business assistance application is reported from the information terminal 10A to the application #11 operating in the workflow server 20.

Subsequently, the application #11 registers the electronic document in the application #12 designated as a transfer destination. In this case, the user B using the application #12 confirms the electronic document to be transferred, and gives a command for merging of transferred attributes to the application #12.

FIG. 14 illustrates a transfer process in a case where a specific user is selected as a transfer destination. In a case where a user is designated as a transfer destination, the transfer of an electronic document to a business assistance application that a transfer source is not authorized to use becomes possible via the user designated as the transfer destination.

First, the user A uses the information terminal 10A to operate the application #11 that assists with the transfer of electronic documents in the workflow, and to select an electronic document to be transferred. The URL of the selected electronic document is reported to the transfer server 30 from the application #11.

The transfer server 30 uses information about one or more attributes attached to the electronic document and presents candidates for a user taking over the business operation or candidates for a business assistance application on the information terminal 10A. The candidates for a business assistance application are limited to business assistance applications that the user A is authorized to use.

In this case, a user is designated as a transfer destination. The user B is designated here. In this case, the user B is notified of a transfer request to the information terminal 10B from the application #11.

The user B notified of the request connects to the workflow server 20 from the information terminal 10B and selects a business assistance application to be used for the transfer. In this case, the application #13 is selected. The application #13 has the electronic document registered therein from the application #11.

Subsequently, the user B gives a command for merging of transferred attributes to the application #13. In this case, the merging is optional.

Other Exemplary Embodiments

Although the exemplary embodiment of the present disclosure has been described above, the technical scope of the present disclosure is not limited to the scope described in the above exemplary embodiment. It is obvious from the scope of the claims that various modifications and alterations added to the above exemplary embodiment are included in the technical scope of the present disclosure.

For example, the process executed by the workflow server 20 in the above exemplary embodiment may partially be executed by the transfer server 30, or the process executed by the transfer server 30 may partially be executed by the workflow server 20.

In the exemplary embodiments above, the term "processor" refers to hardware in a broad sense. Examples of the processor include general processors (e.g., CPU: Central Processing Unit) and dedicated processors (e.g., GPU: Graphics Processing Unit, ASIC: Application Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The exemplary embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to
   display information on a screen that accepts a setting of a transfer destination for an electronic document prepared in a first application that a first user is authorized to use, the information accepting selection of another application among a plurality of applications that the first user is authorized to use, and the information further accepting a second user as a candidate for the transfer destination,
   in response to the selection of the transfer destination,
   in a case that the another application is accepted as the transfer destination, display, to the first user, another screen that accepts selection of an attribute that permits transfer from among one or more attributes added to the electronic document,
   in a case that the second user is accepted as the candidate for the transfer destination other than the another application, display, to the second user, a screen used for selecting a candidate for a second application used for processing the electronic document serving as a transfer target, the second user is authorized to use the second application that the first user is not authorized to use.

2. The information processing apparatus according to claim 1, wherein the processor extracts, as the candidate, the second user linked with one or more attributes added to the electronic document serving as the transfer target.

3. The information processing apparatus according to claim 2, wherein the second user is one of a plurality of second users, and
   wherein the processor displays, to the first user, an attribute recognized as being linked with the second user from among the one or more attributes added to the electronic document serving as the transfer target, the attribute being displayed in a state where the attribute is linked with each of the second users.

4. The information processing apparatus according to claim 1, wherein the processor transfers an attribute value of the attribute selected as a transfer target by the first user to the second application used for processing the electronic document by the second user.

5. The information processing apparatus according to claim 4, wherein, in a case where the attribute of the electronic document selected as the transfer target in the first application by the first user is an attribute not to be added subsequently to the electronic document but is not treated by the second application as an attribute not to be added subsequently to the electronic document, the processor transfers the attribute to the second application as a subsequently-added attribute.

6. The information processing apparatus according to claim 4, wherein the processor does not transfer an attribute value of an attribute excluded from the transfer target by the first user to the second application used by the second user taking over the processing of the electronic document.

7. The information processing apparatus according to claim 6, wherein, in a case where the attribute of the electronic document excluded from the transfer target in the first application by the first user is an attribute added subsequently to the electronic document, the processor does not transfer the attribute to the second application.

8. The information processing apparatus according to claim 1, wherein the processor notifies the second user of a location where the electronic document is stored as transfer-related information.

9. The information processing apparatus according to claim 1, wherein the processor extracts, as the candidate for the second application, an application linked with an attribute attached to the electronic document serving as the transfer target.

10. The information processing apparatus according to claim 1, wherein the processor acquires the electronic document from a location where the electronic document is stored, and registers the electronic document in the second application selected by the second user.

11. A non-transitory computer readable medium storing a program causing a computer to execute a process, the process comprising:
    displaying information on a screen that accepts a setting of a transfer destination for an electronic document prepared in a first application that a first user is authorized to use, the information accepting selection of another application among a plurality of applications that the first user is authorized to use, and the information further accepting a second user as a candidate for the transfer destination,
    in response to the selection of the transfer destination,
    in a case that the another application is accepted as the transfer destination, displaying, to the first user, another screen that accepts selection of an attribute that permits transfer from among one or more attributes added to the electronic document,
    in a case that the second user is accepted as the candidate for the transfer destination other than the another application, displaying, to the second user, a screen used for selecting a candidate for a second application used for processing the electronic document serving as a transfer target, the second user is authorized to use the second application that the first user is not authorized to use.

12. An information processing method comprising:
    displaying information on a screen that accepts a setting of a transfer destination for an electronic document prepared in a first application that a first user is authorized to use, the information accepting selection of another application among a plurality of applications that the first user is authorized to use, and the information further accepting a second user as a candidate for the transfer destination,
    in response to the selection of the transfer destination,
    in a case that the another application is accepted as the transfer destination, displaying, to the first user, another screen that accepts selection of an attribute that permits transfer from among one or more attributes added to the electronic document,
    in a case that the second user is accepted as the candidate for the transfer destination other than the another application, displaying, to the second user, a screen used for selecting a candidate for a second application used for processing the electronic document serving as a transfer target, the second user is authorized to use the second application that the first user is not authorized to use.

\* \* \* \* \*